July 7, 1953     A. R. VOGEL     2,644,667

CABLE RETAINER

Filed March 26, 1951

INVENTOR:
Alvin R. Vogel
By Herbert E. Metcalf
HIS PATENT ATTORNEY

Patented July 7, 1953

2,644,667

UNITED STATES PATENT OFFICE 2,644,667

CABLE RETAINER

Alvin R. Vogel, Los Angeles, Calif., assignor to Northrop Aircraft, Inc., Hawthorne, Calif., a corporation of California Application March 26, 1951, Serial No. 217,475

4 Claims. (Cl. 254—193)

My invention relates to a means for retaining cables on pulleys and the like, and more specifically to a means for retaining control cables in pulleys in aircraft control systems.

It is the object of my invention to provide an economical means, of light weight, for reliably retaining cables in pulleys, such as are found in the control systems of aircraft for example, which will allow cables to be disengaged from pulleys simply and easily without removing the cable retainer. Cable retainers are normally mounted near the pulleys and positioned in such a way that the respective cable cannot slip out of the pulley grooves during slackened conditions or become displaced therefrom, during operating conditions.

Briefly, my invention preferably comprises a spring-loaded roller slidably mounted on a threaded post positioned in relation to the pulley to prevent the cable from accidently leaving the pulley groove, which will be more clearly understood by referring to the drawings, wherein.

Figure 1:
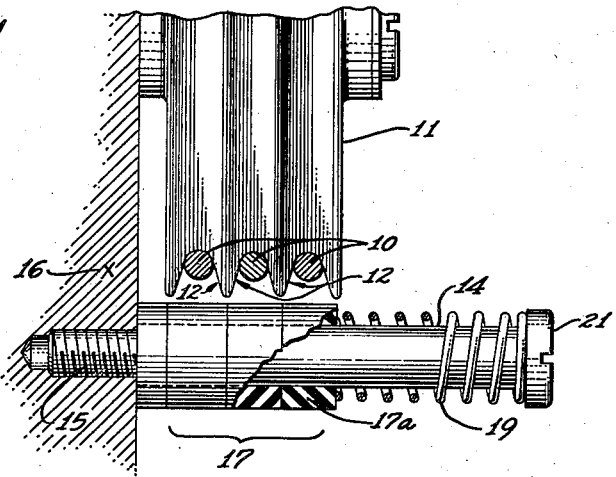
Figure 1 is an end elevational view partly in longitudinal section of a pulley and cable installation, showing one preferred form of my invention in position.

In Figure 1, for example, a number of cable sections 10 are engaged with and routed around a typical cable pulley 11 and seated in a number of grooves 12 around the circumference thereof. A single shouldered screw post 14, threaded on one end thereof, is fastened into a threaded bore 15 in the adjacent structure 16. A number of tubular rollers 17, of a lightweight material such as a phenolic plastic for example, are slidably mounted on the shank of the screw post 14 and positioned in proximity to the grooved circumference of the pulley 11 to transversely oppose the cables 10. The screw post 14 has a shank long enough to accommodate a compression spring 19 thereon, interposed between the outermost roller 17a and a slotted head 21 provided at the other end of the screw post 14. The rollers 17 are held in tension by the spring 19 in a position relative to the cables 10 to prevent their slipping out of their respective pulley grooves 12 during slackening of the cables, or jumping from one groove 12 to another under operating conditions.

Figure 2:
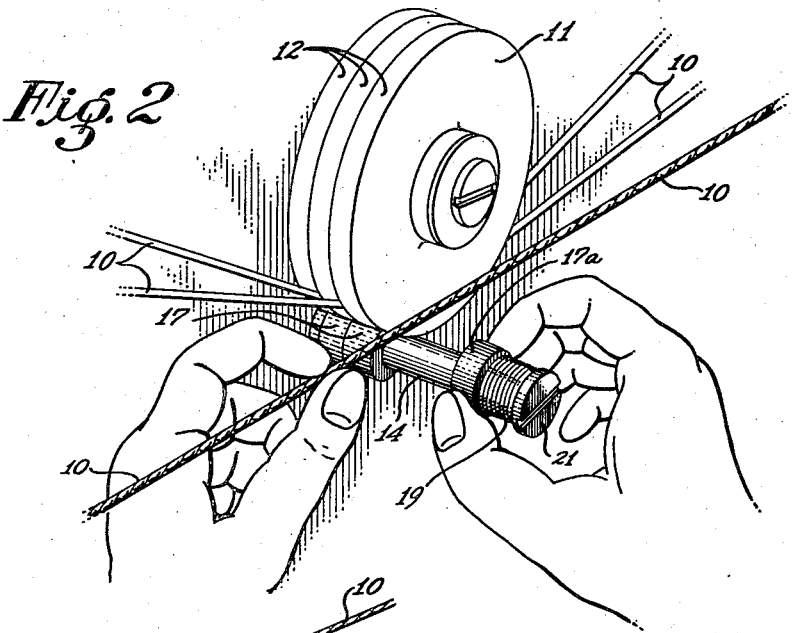
Figure 2 is a perspective view illustrating the step of disengaging a cable from a pulley wherein the present embodiment of my invention is used.

The rollers 17 can be easily moved away from the cables 10, as shown in Figure 2, by simply pulling the roller axially against the spring 19 with one hand and disengaging the cable 10 from the pulley groove 12 with the other hand. If it is desirable to disengage all of the cables 10 from the pulley 11, each roller 17 is easily moved out of the way, and much time and effort is saved in eliminating the conventional step of completely removing cable retainers. The chance that the cable retainer or parts thereof being lost is also avoided.

Figure 3:
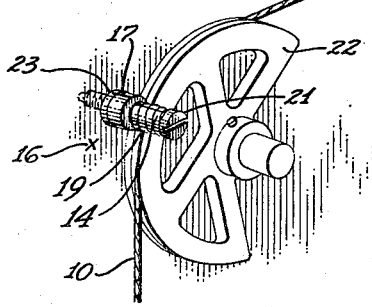
Figure 3 is a perspective view of a quadrant and cable with a retainer installed for maximum safety.

In Figure 3, a cable retainer of the present invention is shown in position to retain and protect a cable 10 routed at a 90° turn around a typical single cable control quadrant 22. One roller 17 is shown, having a spacer 23 between the roller 17 adjacent structure 16. A spacer 23 of any length can be used to position the rollers 17 relative to the cable 10 so long as screw posts 14 of sufficient length are provided therefor.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. Means for retaining cables in a grooved pulley and the like, said pulley having a plurality of cable turns in a plurality of grooves thereon, said means comprising a post element positioned in proximity to said pulley transversely to said grooves, said post having a retaining means at one end thereof, a plurality of rollers rotatably and slidably mounted on said post, each of said rollers opposing one of said cables, and a spring mounted on said post, said spring being interposed between said rollers and said retaining means, said spring exerting force against said rollers to retain said rollers in said positions relative to said cables, the length of said post being substantially greater than double the total length of said rollers and said spring when compressed, whereby said rollers can be manually moved away from said positions relative to said cables against the force of said spring toward said retaining means to clear said grooves, to allow removal of said cables from said grooves.

2. A device for retaining a cable in the groove of a cable pulley; which comprises a post headed at one end thereof, roller means slidably mounted on said post, and resilient means positioned intermediate said headed end of said post and said roller means, said post being attached at the end thereof opposite said headed end to a rigid support and positioned closely adjacent the groove of said pulley with said post and said roller means transversely opposed to said cable in said pulley groove, said roller means being maintained in close opposition to said cable by said resilient means to prevent said cable from leaving said groove.

3. A device for retaining cables in a plurality of grooves in a cable pulley; which comprises a post headed at one end thereof, a plurality of tubular sleeves slidably mounted on said post, a spring mounted on said post intermediate said headed end and said sleeves, said post being attached at the end thereof opposite said headed end to a rigid support and positioned closely adjacent said pulley with said post and said sleeves transversely opposed to said grooves, said sleeves being dimensioned and spaced on said post so that one of said sleeves is opposed to the cable in each groove on said pulley, said sleeves being maintained in said closely opposed relation to said cables by said spring to prevent said cables from leaving said grooves.

4. In combination with a pulley having a plurality of grooves therearound, each of said grooves retaining a cable; a retainer comprising a cylindrical post having a head of increased diameter at one end thereof, a plurality of sleeve rollers slidably mounted on said post, and a spring mounted on said post intermediate said head and said rollers, said post having means at the end thereof opposite said headed end for attaching said post to a support to position said post closely adjacent said pulley with said post extending transversely to said pulley grooves, said spring urging said rollers in a direction to position said rollers opposite said cables in said pulley grooves, said rollers being dimensioned and spaced in such a manner that each one of said rollers respectively opposes one of said cables, said rollers being movable along said post, against the force of said spring, away from said position opposite said cables so that said cables can be removed from said grooves.

ALVIN R. VOGEL.

References Cited in the file of this patent

UNITED STATES PATENTS

| Number | Name | Date |
|---|---|---|
| 570,387 | Dickinson | Oct. 27, 1896 |
| 862,460 | Ferris | Aug. 6, 1907 |
| 951,854 | Spillers | Mar. 15, 1910 |
| 1,161,695 | La Forest | Nov. 23, 1915 |
| 1,292,339 | Lopan | Jan. 21, 1919 |
| 1,331,629 | Eisenman | Feb. 24, 1920 |
| 1,629,709 | Jones | May 24, 1927 |
| 2,188,715 | Ingram | Jan. 30, 1940 |